(12) United States Patent
Büntemeyer (10) Patent No.: US 10,303,150 B2
(45) Date of Patent: May 28, 2019

(54) MANUFACTURING METHOD AND SYSTEM FOR IMPLEMENTING THE MANUFACTURING METHOD

(71) Applicant: Kolbus GmbH & Co. KG, Rahden (DE)

(72) Inventor: Kai Büntemeyer, Rahden (DE)

(73) Assignee: Kolbus GmbH & Co. KG, Rahden (DE)

(*) Notice: Subject to any disclaimer, the term of this patent is extended or adjusted under 35 U.S.C. 154(b) by 148 days.

(21) Appl. No.: 15/414,802

(22) Filed: Jan. 25, 2017

(65) Prior Publication Data

US 2017/0212493 A1  Jul. 27, 2017

(30) Foreign Application Priority Data

Jan. 27, 2016  (DE) .................. 10 2016 000 821

(51) Int. Cl.
*B42C 19/00* (2006.01)
*G05B 19/12* (2006.01)
(52) U.S. Cl.
CPC ............ *G05B 19/124* (2013.01); *B42C 19/00* (2013.01); *G05B 2219/21053* (2013.01)
(58) Field of Classification Search
CPC ........ G05B 19/124; G05B 2219/21053; B42C 19/00

USPC ......................................................... 700/116
See application file for complete search history.

(56) References Cited

U.S. PATENT DOCUMENTS

| 2002/0018235 A1* | 2/2002 | Ryan | ...................... G06Q 10/06 358/1.15 |
| 2003/0125179 A1* | 7/2003 | Evans | .................... B65H 45/24 493/405 |
| 2004/0214707 A1 | 10/2004 | Stocklossa et al. | |

FOREIGN PATENT DOCUMENTS

DE       102008033184 A1    3/2010

* cited by examiner

*Primary Examiner* — Ziaul Karim
(74) *Attorney, Agent, or Firm* — Alix, Yale & Ristas, LLP (57) ABSTRACT

In a method for manufacturing movable products, at least one substrate to be processed into the product is provided with an identification that is generated from parameter values of the product to be manufactured in accordance with a rule. This rule is so bijective that identical parameter sets always lead to the same product code incorporated into the identification, and that the product parameter set, on which the identification is based, can be reconstructed from the identification at any time.

21 Claims, 4 Drawing Sheets

MANUFACTURING METHOD AND SYSTEM FOR IMPLEMENTING THE MANUFACTURING METHOD

BACKGROUND

The present invention relates to a method for manufacturing movable products as well as to an associated system.

In the manufacture of movable products, routing slips containing the required manufacturing information are attached to the substrates from which the products are manufactured, e.g. semi-finished products. Such routing slips usually contain a drawing of the finished product, a working program, as well as order-related data such as the production deadline and the required quantity of identical products. Such a routing slip accompanies the product or the products during their manufacture and is used as the basis for the processing carried out in the different processing stations.

In the manufacture of complex products that require a plurality of processing steps, the routing slip has to be read and interpreted by personnel with corresponding frequency. This is very time-consuming and involves numerous sources for reading and interpretation errors. Another disadvantage can be seen in the risk of losing the allocation between the substrate or semi-finished product and the routing slip before the product is finished, whereby at least a significant amount of additional time has to be invested in such instances.

In order to solve these problems, it is known to provide substrates or semi-finished products with an identification that is usually printed on in the form of a barcode or attached in the form of an adhesive tag that carries a barcode. Information on the product to be manufactured and the associated production order is retrieved from a database with the aid of this identification in that the identification contains the designation of a corresponding data set. For this purpose, the production planning department stores a data set for each production order in this database. However, the manufacturing process of a product is frequently distributed over multiple production sites and different companies. This requires a corresponding number of databases, which have to be established and managed manually and respectively contain an indefinitely growing number of data sets, such that the administrative effort is correspondingly high.

SUMMARY

The present invention is directed to a method and system in which at least a few disadvantages of known systems are eliminated.

According to the presently disclosed method, a first step is to determine the values of parameters that are relevant to the manufacture of the product and describe the product, and to combine these parameters into a product parameter set. In another step, a suitable device converts the product parameter set into a product code that identifies at least one substrate required for the manufacture of the product. In this case, the generation of the product code follows such a clear rule that identical product parameter sets are inevitably mapped in the same product code and the product parameter set on which the product code is based, can be determined from the product code with an inverted application of this rule. In this way, manufacturing information on required properties of the product to be manufactured of this substrate can be obtained from the product code.

Prior to the further processing of the substrate, the identification is scanned and setpoint settings for manipulated variables of the device for processing the substrate are determined from the information obtained from the identification. The information obtained from the identification is transmitted to a control unit of the device processing the substrate and used by this control unit in the form of setpoint settings for controllable adjusting mechanisms and controllable drives of the device in order to modify their manipulated variables and to process the substrate. Consequently, the substrate is processed in accordance with information that is obtained from the identification and corresponds to the initially obtained parameter values describing the product to be manufactured.

Since the substrate to be processed in order to manufacture the product carries the product description, the allocation between the substrate and the product description can only be lost if the identification is destroyed, wherein the clarity of the conversion rule for the product parameter set and therefore of the product properties in the product code and the identification makes it possible to reconstruct the original product description from an arbitrary identification at any time and any location as soon as the conversion rule is known and without requiring any further information. The recovery of the production-relevant product description is not dependent on the specification of the production system or the producing company such that the transfer of a manufacturing order or partial order is significantly simplified.

It is preferred that the product parameters can only assume discrete values, whereby this leads to a finite number of possible product parameter sets and therefore a finite number of possible product codes. Depending on the incrementation of permitted values, it is possible to limit the size of the product code to a desired dimension on the one hand and to limit the number of possible product codes on the other hand. In this case, the exclusion of nonsensical values from the permissible range leads to an additional limitation.

In a preferred embodiment, the product code is characterized by the arrangement of a plurality of alphanumeric characters because these characters can be easily processed electronically. The identification is preferably scanned by means of a reading device of the production system such that information no longer has to be visually read and manually transmitted by personnel and a corresponding automation can be realized.

All processes from reading in the identification by means of a reading device of the production system up to the manipulation of the substrate by the processing device, particularly the generation of setpoint settings from the information contained in the identification in order to adapt manipulated variables of the controllable drives and the controllable adjusting mechanisms of the processing device to the product to be manufactured, are advantageously carried out in an automated fashion. It is also possible to realize an automated control by comparing the generate characteristics with the parameter values recovered from the identification.

According to a first enhancement, the identification is formed by an optical marking on the substrate. A number of suitable and inexpensive sensors for reading optical characteristics are commercially available. In addition, an optical marking makes it possible to resort to a visual reading in case of defects or for control purposes.

According to an alternative second enhancement, the identification is formed by a radio tag. The radio tag may also be arranged at a location of the substrate that is not visible or only visible to a limited degree, wherein said radio tag may in addition to the aforementioned identification fulfill other functions relevant to the production and/or use of the product such as, e.g., monitoring the temperature or moisture.

In an advantageous embodiment, the rule for converting a product parameter set into a product code comprises a predefined allocation of the code to the parameter set. This allocation is stored in a database, which can also be used for easily recovering the product parameter set from the product code due to the bijective allocation. This database preferably contains the entirety of allocations of all permissible product parameter sets such that its subsequent expansion is unnecessary.

In an alternative embodiment to the database, the rule is formed by a computer-implemented algorithm that generates the allocations. The storage space required for this algorithm is not dependent on the incrementation and the number of permissible parameter values such that this algorithm is particularly suitable for small to infinitesimal incrementations and very large quantities of permissible values.

When several substrates that form the same product are collectively processed, it is possible to provide only one of the substrates with the identification derived from the product parameter set, whereby setpoint settings for other substrates forming the same product can also be derived from this one identification. In this way, the effort for the identification and its readout can be reduced and, in particular, the number of required reading devices can be minimized.

It is preferred that the control unit of the processing device is connected to an entity, which makes available the rule for the conversion of the product parameter set into a product code, by means of a remote data transmission device such that several processing devices, which may also be located at different production sites, can access the same source of the conversion rule. In this way, the overall storage space for the rule can be reduced. If the rule has to be revised, it is furthermore possible to carry out this revision centrally and it is ensured that all connected processing devices use the same rule with the same revision status.

The data flow is realized by transmitting electric signals via data cables. In this way, the data flow can be achieved in a particularly simple fashion and secured against interferences in the data transmission with conventional measures.

The data flow is alternatively realized by transmitting electromagnetic signals that lie in the visible spectrum via optical devices such as, e.g., optical waveguides. Radio links may also be used if the signals lie in the invisible spectrum. In this way, even great spatial distances between the production system and the device making available the rule for converting the product parameter set into a product code can be realized and the number of devices, which make available the rule for a plurality of production systems, can be minimized.

It is furthermore possible to realize a combination, in which the information is in certain sections transmitted in the form of electric signals and in other sections in the form of electromagnetic signals.

According to a first embodiment, the remote data transmission device comprises a directional connection to a computer center that makes available the rule for converting the product parameter set into a product code. In this way, the time required for the data exchange can be minimized with high transmission reliability.

According to a second embodiment, the remote data transmission takes place non-directional to an Internet server that makes available the rule for converting the product parameter set into a product code. This makes it possible to utilize the existing infrastructure of the Internet and to minimize the expenditures for the data transmission.

According to a preferred enhancement, the product code is expanded into an order code, which is used as identification of the substrate, with order-related information such as, e.g., the number of units to be manufactured, the production deadline and/or the recipient. In this way, the substrate can carry all production- and order-relevant information such that the automation of the additionally enhanced product manufacture can additionally enhanced.

BRIEF DESCRIPTION OF THE DRAWINGS

An exemplary embodiment of the inventive method, as well as the system for implementing the method, is described in greater detail below with reference to the figures. In these figures.

DETAILED DESCRIPTION

Figure 1:
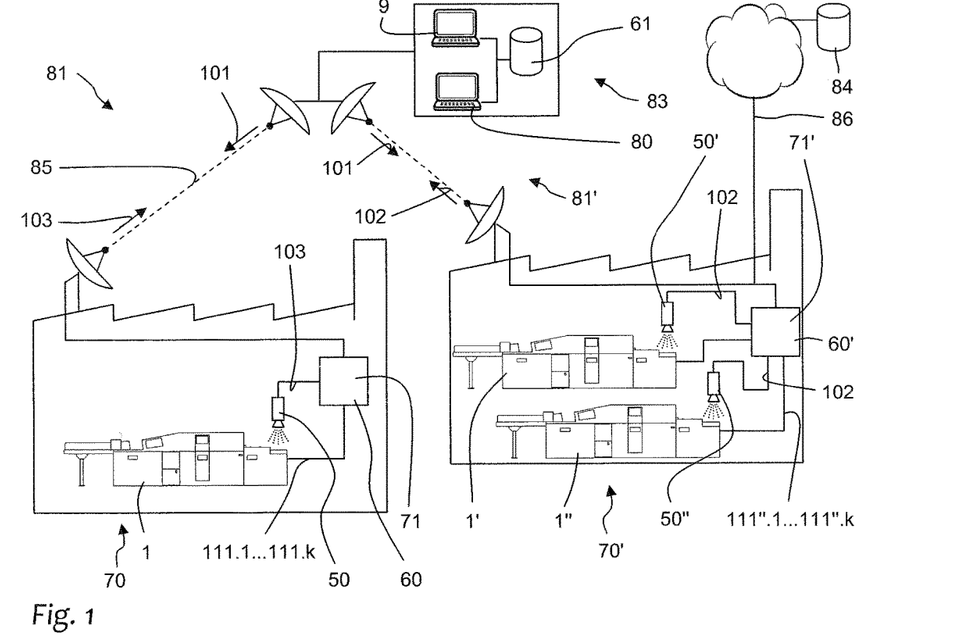
FIG. 1 shows a schematic representation of several production systems with their data network.
Figure 4:
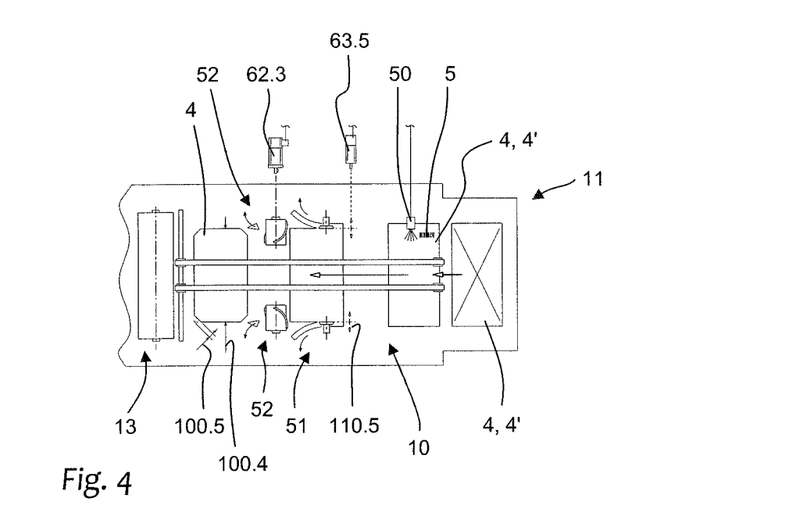
FIG. 4 shows a detail of a schematic section through a casemaker in a second transport plane.

FIG. 1 shows an example of a first production system 70 that is respectively used in print finishing or the production of book cases and comprises a casemaker 1. The production system features a control unit 60 that transmits setpoint settings 111.1-111.$k$ to the casemaker 1 in order to adapt its manipulated variables 110.1-110.$m$. A reading device 50 of the production system 70 scans the barcode 5, which represents an order code 103 and is applied onto the blank 4, 4' to be covered being supplied as illustrated in FIG. 4.

The reading device 50 comprises a camera and transmits the acquired order code 103 to the control unit 60 connected thereto.

The production system 70 furthermore features a remote data transmission device 81 that allows the bidirectional data exchange between the control unit 60 and a computer center 83 arranged outside the production system 70 via a direct data link 85. The production system 70 transmits the order code 103 acquired by the reading device 50 to the computer center 83 via the remote data transmission device 81 and in turn receives the product parameter set 101, on which this order code 103 is based, from said computer center.

For this purpose, the computer center 83 comprises a database 61 that contains data sets of permissible product parameter sets 101, as well as product codes 102 and order codes 103 assigned to these product parameter sets. In addition, the computer center 83 features an order translation device 80 that uses the received order code 103 for determining the product parameter set 101, on which this order code is based, with the aid of the database 61 and makes this product parameter set available to the production system 70 via the remote data transmission device 81. The order translation device 80 of the computer center 83 is also capable of generating order data from the order code 102 and transmitting this order data to the production system 70. The computer center 83 furthermore features a product translation device 9 that determines the corresponding product parameter set 101 from a received product code 102 comparable to the order translation device 80.

In order to obtain the setpoint settings 111.1-111.k for the controllable drives 62.1-62.3 and controllable adjusting mechanisms 63.1-63.5 of the casemaker 1 required for the production of the book case 8 from the received product parameter set 101, the control unit 60 of the production system 70 contains a production translation device 71 that is assigned to the casemaker 1.

A second production system 70' is also illustrated in FIG. 1 and comprises two casemakers 1' and 1" that respectively correspond to the casemaker 1 of the above-described first system 70. Reading devices 50' and 50" are respectively assigned to each of these casemakers 1' and 1" in order to scan a barcode 5 of the respectively supplied blank 4, 4' to be covered and to transmit this barcode to the control unit 60' of the second system 70'. Analogous to the first production system 70, the second system 70' also comprises a remote data transmission device 81' for transmitting the code 102 acquired by the reading devices 50', 50" to the same computer center 83 in order to recover the product parameter set 101.

In the second system 70', the acquired barcodes 5 contain a product code 102 rather than an order code 103 as it is the case in the above-described first production system 70. This order code 103 comprises the information on the book cases 8 to be manufactured that is contained in the product code 102, as well as additional information on order data such as, e.g., quantity, deadline and client. A control unit 60' of the production system 70' transmit the product code 102 acquired by its reading devices 50', 50" to the computer center 83 via a remote data transmission device 81' and in turn receives the product parameter set 101, on which this product code is based, from the computer center.

The second production system 70' furthermore features another data link 86 for accessing a data storage unit 84 via the Internet. Analogous to the database 61 of the computer center 83, the data storage unit 84 makes available the required information for respectively determining the corresponding product parameter sets 101 from product codes 102 or order codes 103.

The algorithm 90 containing the conversion rule may be made available by the computer center 83 and/or the data storage unit 84 rather than by a database 61. This algorithm 90 is respectively used by the order translation devices 80 and the product translation devices 9 for converting product parameter sets 101 on the one hand and product codes 102 or order codes 103 on the other hand into one another. For this purpose, the control unit 60' of the production system 70' comprises the functionalities of the translation devices 9, 80.

Figure 7:
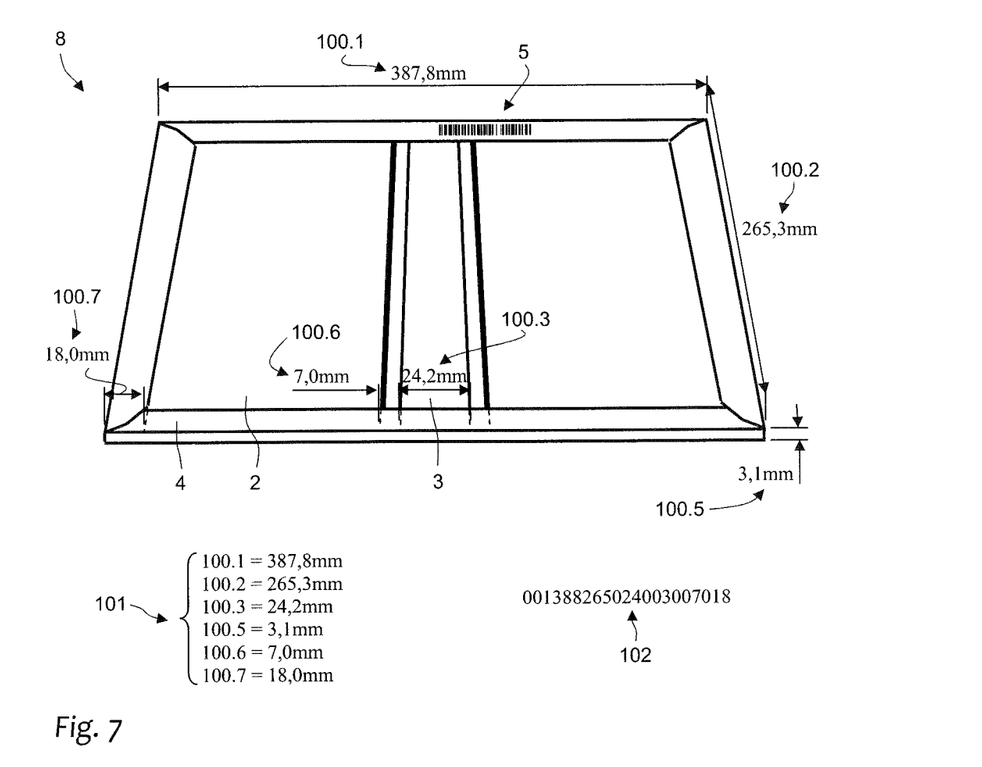
FIG. 7 shows a rigid book cover not drawn in scale with some stated dimensions and a related set of product parameters 101 as well as product identification code 102.

With reference to FIG. 7, a representative algorithm 90 for converting the product parameter set 101 into an identification code 102 is: "Round all values of parameter 100.1 to 100.7 scaled to millimeters to integer; write them each in three digits directly behind each other in the order <width of the cover (100.1)>, <height of the cover (100.2)>, <width of the spine strip (100.3)>, <thickness of cover (100.5)>, <distance of board to spine strip (100.6) and width of turning in (100.7); prefix the typus of product in three digits."

The identification code 102 becomes 001388265024003007018 in this example:

001xxxxxxxxxxxxxxxxxxx names product typus (parameter is 1 for standard book cover), xxx388xxxxxxxxxxxxxxx names width of cover 8 (100.1) is to be 388 mm (387.8 mm rounded to 388 mm), xxxxxx265xxxxxxxxxxxx names height of cover 8 (100.2) is to be 265 mm (265.3 mm rounded to 265 mm), xxxxxxxxx024xxxxxxxxx names width of spine strip 3 (100.3) is to be 24 mm (24.2 mm rounded to 24 mm), xxxxxxxxxxxx003xxxxxx names thickness of cover 8 (100.5) is to be 3 mm (3.2 mm rounded to 3 mm), xxxxxxxxxxxxxxx007xxx names distance board 2 to spine strip 3 (100.6) is to be 7 mm, xxxxxxxxxxxxxxxxxx018 names width of lateral turning in (100.7) is to be 18 mm.

For using common and therefore cheap bar code readers the identification code 102 is printed onto the blank 4 in the form of a barcode 5. In this example the reading device 50 shown in FIG. 1 and in FIG. 4 is a bar code reader reading the bar code 5 printed onto the blank 4. It gives the product identification code 102 read out from the bar code 5 to the control unit 60.

For positioning the circular knives of the lateral trimming devices 51 the control unit 60 calculates the target value from digits 3 to 6 and 10 to 21 of the identification code 102. In this example the width of the blank 4 is to be $$100.4 = 100.1 + 100.3 + 2*(100.5 + 100.6 + 100.7) \qquad (i)$$
$$= 388 \text{ mm} + 24 \text{ mm} + 2*(3 \text{ mm} + 7 \text{ mm} + 18 \text{ mm})$$
$$= 468 \text{ mm}$$

The algorithm for calculating the target value of the knife positioning adjusting unit 63.5 is given by the unit's 63.5 structural design. By way of example the drive is connected to the circular knifes via a gear having a gear ratio of 100 and a spindle drive having a thread pitch of 16. The initial position is given by the center line, so there is no offset. Thus the translator 71 being incorporated by the control unit 60 uses the algorithm:

$$\text{target value} = \text{total gear ratio} * \qquad (ii)$$
$$[100.1 + 100.3 + 2*(100.5 + 100.6 + 100.7)] + \text{offset}$$
$$= [100*(16*360°/\text{mm}]*$$
$$[388 \text{ mm} + 24 \text{ mm} + 2*(3 \text{ mm} + 7 \text{ mm} + 18 \text{ mm})] + 0$$
$$= 576,000°$$

The example of FIG. 7 uses a representative algorithm and product parameter set to illustrate converting a product parameter set 101 into an identification code 102. The algorithm can be reversed to recover a product parameter set 101 from the product identification code 102. The product parameter set 101 may contain different parameters and/or a different amount of parameters. Also the identification code 102 may differ in size and/or typus as well as the barcode 5. Further, the identification code 102 and/or the barcode 5 may include additional information not given by the product parameter set 101.

Figure 5:
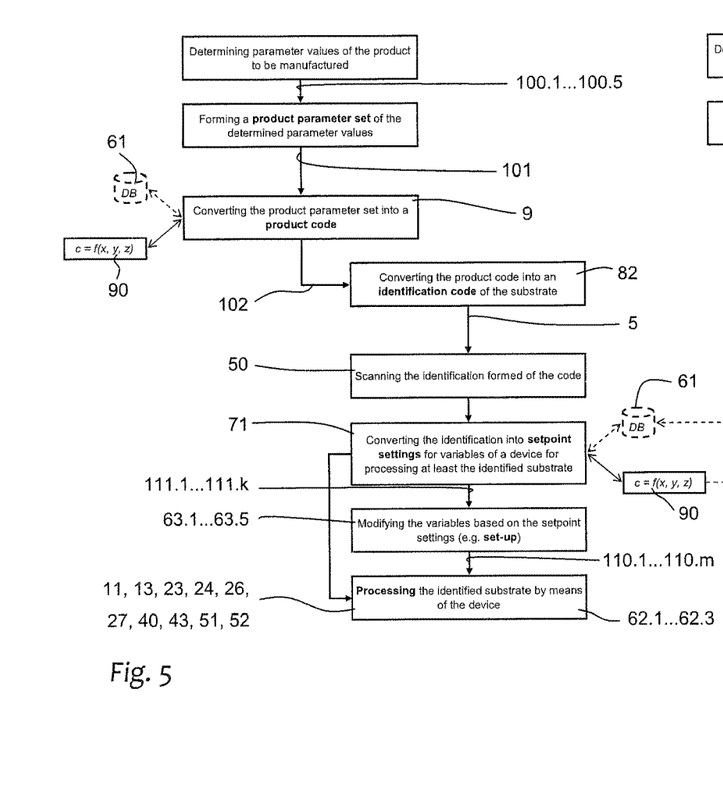
FIG. 5 shows a flowchart of a manufacturing method that is based on product parameters.
Figure 6:
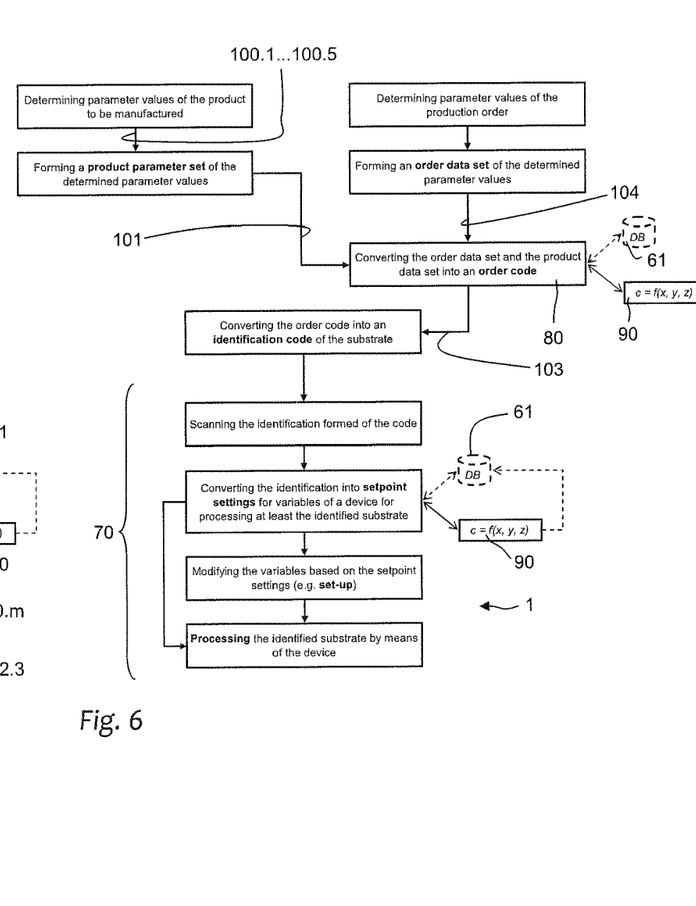
FIG. 6 shows a flowchart of a manufacturing method that is based on product parameters and order-related information.

The data flows of the production systems 70, 70' are illustrated in FIG. 5 and in FIG. 6. Both instances begin with the determination of the parameter values 100.1-100.5 of the book case 8 to be manufactured, wherein these parameter values are combined into a product parameter set 101. In the method illustrated in FIG. 5, a product translation device 9 directly generates a product code from the product parameter set 101 by utilizing the available algorithm 90. Alternatively, the product translation device 9 utilizes a database 60 that is illustrated with broken lines and in which the bijective allocations between product parameter sets 101 and product codes 102 are stored. In the alternative method illustrated in FIG. 6, in contrast, an order translation device 80 generates an order code 103 from the product parameter set 101 and an order data set 104 obtained from previously determined parameter values of the associated production order.

In both instances, the obtained code 102, 103 is converted into an identification of the blank 4, 4' to be covered in that it is applied onto the blank 4, 4' in the form of a barcode 5 by means of a printing device 82. This barcode 5 is respectively acquired by a reading device 50, 50', 50" assigned to the casemaker 1, 1', 1" and the obtained information is transmitted to a data processing device 71 for further processing in order to generate setpoint settings 111.1-111.$k$ for the adjusting mechanisms 63.1-63.5 and the controllable drives 62.1-62.3. According to FIG. 1, this data processing device 71 may be divided into the control unit 60, 60' of the production system 70, 70' and a product translation device 9 or order translation device 80 because individual properties of the production systems 70, 70', as well as their casemakers 1, 1', 1", are also incorporated in addition to the product-related data. In order to convert the acquired barcode 5 into the setpoint settings of 111.1-111.$k$, the data processing device 71 utilizes a database 61 as described above with reference to FIG. 1 or an algorithm 90 of the type illustrated in FIGS. 5 and 6 or a combination of an algorithm 90 and a database 61.

The setpoint settings 111.1-111.$k$ are used by the adjusting mechanisms 63.1-63.5 and the controllable drives 62.1-62.3 of the casemaker 1, 1', 1" for adapting the manipulated variables 110.1-110.$m$ or directly for the operation of the processing devices 11, 13, 23, 24, 26, 27, 40, 43, 51, 52.

Figure 2:
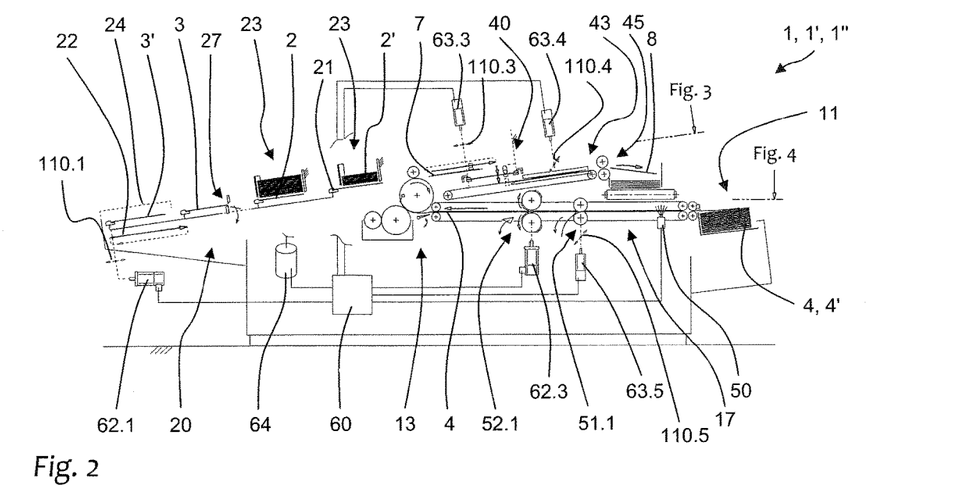
FIG. 2 shows a schematic side view of a casemaker.
Figure 3:
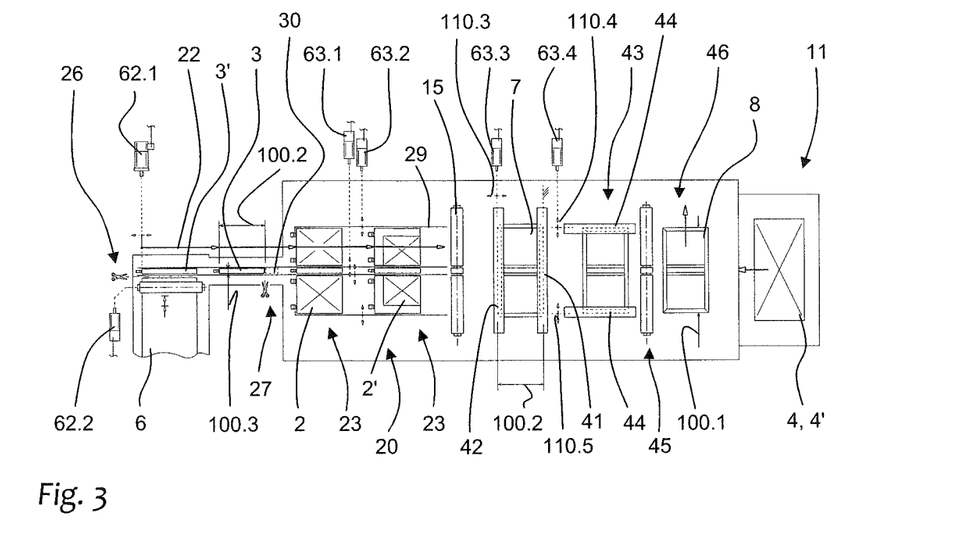
FIG. 3 shows a schematic section through a casemaker in a first transport plane.

In order to elucidate these circumstances, FIGS. 2-4 show a casemaker 1, 1', 1" of the production systems 70 and 70', in which book cases 8 are manufactured by assembling cover boards 2 and spine strips 3 on blanks 4 to be covered. One respective blank 4 to be covered is removed from a blank magazine 11 and fed to a blank cylinder by a clamping belt conveyor 17 of a blank feeder mechanism 10, wherein said blank cylinder takes hold of the blank 4 to be covered with grippers, guides the blank past an application roller of a gluing station 13 and ultimately rolls the blank onto two synchronously supplied cover boards 2 and one spine strip 3 in the assembly point.

Pressing rollers 15 press the boards 2, 3 onto the blank 4 to be covered in the assembly point and a reciprocating suction beam transfers the assembled book case 7 from the roll-down device formed by the blank cylinder and the pressing rollers 15 to a turn-in and pressing station that consists of a head/foot turn-in station 40 and the lateral turn-in station 43 for turning in the protruding edges of the blank to be covered, as well as a pair of pressing rollers 45 for firmly rubbing down the cover boards 2, 3 onto the blank 4 to be covered. The finished book cases 8 are stacked in a delivery station 46, from which they are then manually removed.

The cover boards 2 are located in a board magazine 23. The respective bottom cover boards are ejected by a board pusher 21 of a board feeder mechanism 20 and transferred into an intermediate position, from which they are fed to the assembly point by another board pusher 21 while being aligned on outer board guides 29. The board pushers 21 are coupled at a fixed distance from one another and moved forward and backward in accordance with the production cycle with a constant transport stroke 22 corresponding to this distance.

The spine strips 3 are advanced by the board pushers 21 in a guide channel 30 that can be adjusted to the corresponding spine strip width 100.3 by means of the barcode 5 in the above-described fashion, wherein the spine strips 3 are introduced into the guide channel 30 extending beyond the board magazine 23 downstream of this board magazine 23. A spine strip web 6 consisting of a flexible center strip roll is pushed into the guide channel 30 transverse to the board feed direction by a center strip feeder mechanism 24, as well as severed from the spine strip web 6 with the corresponding spine strip width 100.3 by means of a cutting device 26 and thereby completely transferred into the guide channel 30. The coupled board pushers 21 transport the severed spine strip 3 into a position within the board magazine 23, from which it is transported onward up to the roll-down device together with the cover boards 2 with the third and the fourth transport stroke 22 of the board pushers 21.

The spine strip 3' severed from the spine strip web 6 may be slightly longer than the required spine strip length. The respective spine strip length is defined by the book case height 100.2 and realized by cutting off a waste section on one side by means of a cutting device 27 arranged on the guide channel 30.

The conversion of the casemaker 1, 1', 1" for its adaptation to different formats of the book case 8 to be produced takes place while the machine is running and book cases 8 are still processed. A respective adjustment is carried out as soon as soon as the respective processing of the previous book case 7, 8 or book case parts 2, 3, 4 is completed, i.e. the required adjustments are not carried out simultaneously with the pass of the book cases and book case parts, but rather successively.

The adjustments are carried out in a motor-driven fashion by means of adjusting mechanisms 63.1-63.5 and coordinated by a central control unit 60. Adjustments 110.4 with respect to the open width 100.1 of the book case 8 can be realized by respectively positioning the outer board guides 29 and the lateral turn-in devices 44 accordingly by means of adjusting mechanisms 63.2 and 63.4. The adjustment 110.4 takes into account the spine strip width 100.3, wherein the width of the guide channel 30 is varied by means of an adjusting mechanisms 63.1 whereas a respectively required spine strip width 100.3 of the spine strip 3 is supplied due to a modified feed stroke of a controllable drive 62.2 that is connected to the pair of pull-off rollers. The changing open width 100.1 of the book case 8 is compensated with respect to the fixed blank width 100.4 of the blank 4 to be covered with a modified turn-in width in the lateral turn-in station 43.

In order to manufacture book cases 8 with different heights and/or open widths 100.1, different sizes of cover boards 2, 2' are in the exemplary embodiment made available in two board magazines 23 arranged along the board feeder mechanism 20, wherein the cover boards 2, 2' can be selectively removed from the first or the second board magazine 23 by the board pushers 21 in accordance with the respective book case size to be manufactured. The arrangement of additional board magazines makes it possible to further enhance the flexibility and variance of different sizes of book cases 8 during the production. However, the uninterrupted processing of different sizes of cover boards 2, 2' can also be realized by stacking the different cover boards 2 2' in only one board magazine, e.g. in the board magazine 23, in the sequence in which they are processed.

In the casemaker 1, 1', 1" shown, the leading edge of the cover boards 2, 2' and spine strips 3 is defined as a fixed reference edge by the front edge stops of the board magazines 23, which are rigidly arranged on the machine frame. The processing of cover boards 2, 2' and spine strips 3 with different heights therefore requires a format adjustment 110.1 of the stroke position of the constant transport stroke 22, wherein this format adjustment is realized in the form of an electronic adjustment of a servomotor 62.1 provided for driving the board pushers 21. In addition, the book case height 100.2 is adjusted in the head/foot turn-in station 40, wherein the position 110.3 of a foot turn-in device 42 is modified relative to a head turn-in device 41, which is rigidly arranged on the machine frame, by means of an adjusting mechanism 63.3.

Left and right corner cutters 52 are arranged along the blank feeder mechanism 10 in order to cut off corner sections with a width 100.5 on the leading and trailing edge during the pass of the blanks 4 to be covered. The rotative tools of the corner cutters 52 are driven by a servomotor 62.2, by means of which the corner section width 100.5 can be electronically adjusted in accordance with the respective height 100.2 and open width 100.1 of the book cases 8.

Furthermore, left and right lateral trimming devices 51 with driven circular knives are arranged along the blank feeder mechanism 10 in order to cut off lateral edge sections of wider blanks 4' to be covered during the pass of the blanks 4. An adjustment 110.5 is provided in order to achieve the respectively required blank width 100.4 and realized by positioning the pairs of circular knives of the lateral trimming device 51 relative to one another in accordance with the respective blank width 100.4 by means of an adjusting mechanism 63.5. In this way, different sizes of blanks 4 to be covered can be cut from supplied standard sizes of blanks 4'.

The invention claimed is:

1. A method for respectively manufacturing movable products (8) from a substrate (2, 2', 3, 3', 4, 4'), comprising the steps of
    determining parameter values (100.1-100.5) of the product (8) to be manufactured,
    forming a product parameter set (101) of the certain product parameters (101.1-101.5),
    converting the product parameter set (101) into a product code (102) by a product translation device (9),
    converting the product code (102) into an identification (5) that represents the product code, wherein this identification (5) is carried by the substrate (2, 2', 3, 3', 4, 4') required for the manufacture of the product (8),
    scanning the identification (5),
    converting the scanned identification (5) into setpoint settings (111.1-111.k) for manipulated variables (110.1-110.m) of a machine (1, 1', 1") for manufacturing the movable products (8) from the substrate (2, 2', 3, 3', 4, 4'),
    modifying manipulated variables (110.1-110.m) of the machine (1, 1', 1") based on the determined setpoint settings (111.1-111.k) by an adjusting mechanisms (63.1-63.5) and/or controllable drives (62.1-62.3) of the machine (1, 1', 1"), and
    processing the identified substrate (2, 2', 3, 3', 4, 4') by the machine (1, 1', 1") based on the scanned identification (5),
    wherein
    at least the conversion of the product parameter set (101) into a product code (102) by the product translation device (9) follows a clear bijective rule such that identical product parameter sets (101) always lead to the same product code (102), and
    the corresponding parameter set (101) is determinable from any product code (102) with an inverted application of the same bijective rule.

2. The method according to claim 1, comprising establishing a permissible value range of each parameter (100.1-100.5), wherein the permissible value range of each parameter (100.1-100.5) forming the product parameter set (101) comprises a finite number of discrete values only, and an arbitrary combination of permissible values leads to a finite number of possible product parameter sets (101).

3. The method according to claim 1, wherein the product code (102) is an alphanumeric code.

4. The method according to claim 1, wherein the scanned identification (5) is acquired by a reading device (50, 50', 50") that is operatively connected to at least one control unit (60, 60') of the machine (1, 1', 1").

5. The method according to claim 1, wherein converting the product code (102) into the identification (5) comprises forming an optically detectable marking on the substrate (2, 2', 3, 3', 4, 4').

6. The method according to claim 1, wherein converting the product code (102) into the identification (5) includes attaching a radio tag to the substrate (2, 2', 3, 3', 4, 4').

7. The method according to claim 1, wherein the steps of:
    scanning the identification (5),
    converting the scanned identification (5) into setpoint settings (111.1-111.k) for manipulated variables (110.1-110.m) of a machine (1, 1', 1") for manufacturing the movable product (8), and
    modifying manipulated variables (110.1-110.m) by an adjusting mechanisms (63.1-63.5) or individual drives (62.1, 62.2, 62.3) of the machine (1, 1', 1") based on the determined setpoint settings (111.1-111.k) are performed automatically by said machine (1, 1', 1").

8. The method according to claim 1, comprising allocating a predefined bijective of one respective product code (102) to a product parameter set (101).

9. The method according to claim 8, establishing a permissible value range of each parameter (100.1-100.5), wherein the predefined bijective allocations between permissible product parameter sets (101) and product codes (102) are stored in a database (61, 61').

10. The method according to claim 1, wherein converting the product parameter set (101) into the product code is performed with an invertible computer-implemented algorithm (90).

11. The method according to claim 1, wherein
    a particular product (8) is manufactured from a plurality of substrates (2, 2', 3, 3', 4, 4'),
    one of the plurality of substrates carries an identification whereas the others of the plurality of substrates do not carry an identification, and
    information for processing the other substrates of the particular product (8) is obtained from the scanned identification (5) of the one substrate.

12. The method according to claim 1, wherein a control unit (60, 60') of the machine accesses a database (61, 61') or an algorithm (90) by a remote data transmission device (81, 81').

13. The method according to claim 12, wherein the remote data transmission device (81, 81') communicates over a direct connection to a computer center (83) that stores the database (61, 61') or the algorithm (90).

14. The method according to claim 12, wherein the remote data transmission device (81, 81') communicates with an Internet server (84), and the Internet server (84) provides access to the database (61, 61') or the algorithm (90).

15. The method of claim 12, wherein the remote data transmission device (81, 81') transmits or receives electromagnetic waves that lie in a visible or an invisible spectrum.

16. The method of claim 12 comprising:
making the database (60, 60') or the algorithm (90) available to the machine (1, 1', 1") by a directional, invariable connection (85) of the remote data transmission device (81, 81') to a computer center (83).

17. The method of claim 12 comprising:
making the database (60, 60') or the algorithm (90) available to the machine (1, 1', 1") by a non-directional, variable connection (86) of the remote data transmission device (81, 81') to an Internet server (84).

18. The method according to claim 17, wherein the identification (5) of the substrates (2, 2', 3, 3', 4, 4') contains information for identifying the product code (102), and information on an associated production order.

19. The method of claim 17, wherein the product is a printed product.

20. The method of claim 17, comprising:
providing the machine (1, 1', 1") with a processing device (11, 13, 23, 24, 26, 27, 40, 43, 51, 52) for processing the substrates (2, 2', 3, 3', 4, 4'), wherein said machine includes at least one said controllable drive (62.1-62.3) and at least one said adjusting mechanism with at least one controllable servomotor (63.1-63.5) for adapting at least one processing device (11, 13, 23, 24, 26, 27, 40, 43, 51, 52) to the substrate (2, 2', 3, 3', 4, 4') to be processed thereby or to the product (8) to be manufactured,
operatively connecting a control unit (60, 60') to the controllable drives (62.1-62.3) of the processing device (11, 13, 23, 24, 26, 27, 40, 43, 51, 52) and controllable servomotors (63.1-5) of the adjusting mechanism,
providing a reading device (50, 50', 50") for the marking, operatively connected to the control unit (60, 60'),
programming a database (61, 61') or an algorithm (90) to convert said marking (5) into parameter values (100.1-100.5) of the product (8) to be manufactured or into said setpoint settings (111.1-111.$k$) for the controllable drives (62.1-62.3) and for the controllable servomotors (63.1-63.5) of the machine (1, 1', 1"), and
using a remote data transmission device (81, 81') to access the database and communicate the parameter values to the machine.

21. The method of claim 20, wherein the remote data transmission device (81, 81') transmits or receives electric signals.

\* \* \* \* \*

UNITED STATES PATENT AND TRADEMARK OFFICE
CERTIFICATE OF CORRECTION

PATENT NO. : 10,303,150 B2
APPLICATION NO. : 15/414802
DATED : May 28, 2019
INVENTOR(S) : Kai Buntemeyer Page 1 of 1

It is certified that error appears in the above-identified patent and that said Letters Patent is hereby corrected as shown below:

In the Claims

Claim 18, Column 11, Line 16:
Delete "17" and insert --1--

Claim 19, Column 11, Line 20:
Delete "17" and insert --1--

Claim 20, Column 11, Line 22:
Delete "17" and insert --1--

Signed and Sealed this
Thirty-first Day of December, 2019

Andrei Iancu
*Director of the United States Patent and Trademark Office*